(12) United States Patent
Yu et al.

(10) Patent No.: US 7,379,495 B2
(45) Date of Patent: May 27, 2008

(54) ADAPTIVE SIGNAL LATENCY CONTROL FOR COMMUNICATIONS SYSTEMS SIGNALS

(75) Inventors: Qian Yu, Santa Clara, CA (US); Venugopal Balasubramonian, Campbell, CA (US); Jishnu Bhattacharjee, San Jose, CA (US); Debanjan Mukherjee, San Jose, CA (US); Abhijit Phanse, Cupertino, CA (US); Abhijit G. Shanbhag, Sunnyvale, CA (US); Edem Ibragimov, Santa Clara, CA (US); Fabian Giroud, San Jose, CA (US)

(73) Assignee: Scintera Networks Inc., Sunnyvale, CA (US)

( * ) Notice: Subject to any disclaimer, the term of this patent is extended or adjusted under 35 U.S.C. 154(b) by 642 days.

(21) Appl. No.: 10/789,702

(22) Filed: Feb. 27, 2004

(65) Prior Publication Data

US 2004/0202258 A1    Oct. 14, 2004

Related U.S. Application Data

(63) Continuation-in-part of application No. 10/321,893, filed on Dec. 17, 2002, now Pat. No. 6,922,440.

(51) Int. Cl.
H04B 3/46 (2006.01)
(52) U.S. Cl. .................................. 375/232; 375/233
(58) Field of Classification Search ................. 375/232, 375/233
See application file for complete search history.

(56) References Cited

U.S. PATENT DOCUMENTS

| 4,970,703 | A | * | 11/1990 | Hariharan et al. | .......... 367/138 |
|---|---|---|---|---|---|
| 5,191,462 | A | | 3/1993 | Gitlin et al. | |
| 5,301,167 | A | | 4/1994 | Proakis et al. | |
| 6,067,319 | A | * | 5/2000 | Copeland | ...................... 375/232 |
| 6,201,832 | B1 | * | 3/2001 | Choi | ........................... 375/233 |
| 6,529,549 | B1 | | 3/2003 | Norrell et al. | |
| 6,922,440 | B2 | * | 7/2005 | Yu et al. | ....................... 375/233 |
| 2002/0012392 | A1 | * | 1/2002 | Goldston et al. | ............ 375/232 |
| 2002/0140853 | A1 | | 10/2002 | Yang et al. | |

OTHER PUBLICATIONS

John G. Proakis, Digital Communications Fourth Edition, 2001, pp. 332-375, McGraw-Hill Companies, Inc., New York, NY.
Heinrich Meyr et al., Digital Communication Receivers, Synchronization, Channel Estimation, and Signal Processing, 1998, pp. 270-323, John Wiley & Sons, Inc., New York, NY.
U.S. Appl. No. 10/321,893, filed Dec. 17, 2002, Yu et al.
International Search Report dated Oct. 26, 2004, International application No. PCT/US03/38759.

* cited by examiner

*Primary Examiner*—David C. Payne
*Assistant Examiner*—Leon-Viet Q Nguyen
(74) *Attorney, Agent, or Firm*—Vedder Price P.C.

(57) ABSTRACT

An apparatus and method for adaptively introducing a compensating signal latency related to a signal latency of a data symbol decision circuit. Adaptive timing control circuitry, including an interpolating mixer implemented as a tapped delay line with correlated tap coefficients, introduces a latency adaptively and substantially matching the latency of the data decision circuit for use within an adaptive equalizer, thereby minimizing the mean-squared error of such decision circuit. This adaptive latency is used in generating the feedback error signal which, in turn, can be used by the feedforward equalizer for dynamically adjusting its adaptive filter tap coefficients.

31 Claims, 5 Drawing Sheets

ADAPTIVE SIGNAL LATENCY CONTROL FOR COMMUNICATIONS SYSTEMS SIGNALS

RELATED APPLICATIONS

This is a continuation-in-part of U.S. patent application Ser. No. 10/321,893, filed Dec. 17, 2002 now U.S. Pat. No. 6,922,440.

BACKGROUND OF THE INVENTION

1. Field of the Invention

The present invention relates to communications signal transmission and detection, and in particular to adaptive signal equalization for compensation of signal distortions caused by signal dispersion and nonlinearities within signal transmission media.

2. Description of the Related Art

Signal processing architectures for mitigation of different kinds of channel impairments and/or timing recovery and synchronization functions as used for communications transmission and/or storage systems can be divided into two categories: (1) discrete-time architecture (this architecture uses a sampled approach to convert the input continuous-time, analog waveform into a discrete signal and is commonly used in current systems; typically, a high resolution analog-to-digital converter, which follows the analog anti-aliasing filter, is used as the sampler at the analog front end); and (2) continuous-time architecture (this architecture is an analog continuous-time approach which directly processes the incoming analog waveform for mitigating channel impairments or timing recovery functions while remaining in the continuous time domain until the final data bit stream is generated).

In continuous-time signal processing architectures, various system analog components have different frequency-dependent group delays which also vary with dependencies upon variations in fabrication processes, operating temperatures, etc. It becomes important for such architectures to construct an adaptive timing control block which can substantially compensate for (e.g., match) the unknown latency of certain analog components or group of analog components so as to minimize the bit error rate (BER) of the data signal transmission (or improve some other parameter indicative of the data symbol detection reliability). One such parameter, referred to as the Mean-Squared Error (MSE) and computed as the average (continuous-time or sampled) of the square of the difference between the input and the output signals to a decision device (e.g., a signal slicer), is particularly important to this application. It has become known that adapting the tap coefficients in a certain manner so as to minimize the MSE tends to reduce the BER as well.

Fractional-spaced feedforward filters have commonly been used either as stand-alone linear equalizers or in combination with decision feedback. The adaptation technique for the tap coefficients implicitly assume independence in the adaptation of the successive tap coefficients, which has been based on minimizing the mean squared error (as computed as the difference between the slicer input, or pre-slice, signal and slicer output, or post-slice, signal). This adaptation technique is referred to as least mean square error (LMS error or LMSE) or minimum mean square error (MMSE) adaptation. It can be shown that the LMSE adaptation for both fractional feedforward or symbol spaced feedback at iteration k+1 reduces to the following coefficient update equation:

$$\underline{c} = \int_0^t \mu \cdot e(t)\underline{s}(t)dt \quad \text{(continuous-time adaptation case)}$$

where c is the tap coefficient vector and e(t) the corresponding error (between delay-aligned slicer input and output), s is the vector with components as the input waveform to the corresponding tap mixer and $\mu$ is a constant and is an adaptation parameter.

Figure 1:
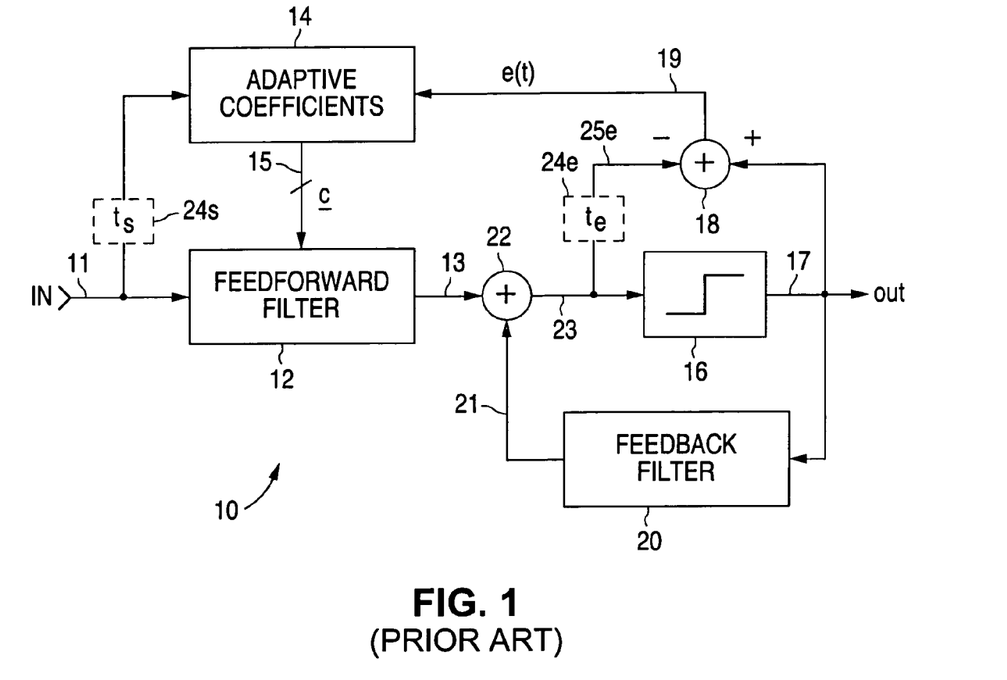
FIG. 1 is a block diagram of a conventional adaptive signal equalizer that includes decision feedback equalization.

Referring to FIG. 1, a conventional adaptive signal equalizer 10 includes a feedforward filter 12, an adaptive coefficients generator 14 and a data symbol decision circuit (e.g., signal slicer) 16. Additionally, if decision feedback equalization is desired, a feedback filter 20 further filters the final output signal 17 from the decision circuit 16 to provide a feedback signal 21 which is combined in a signal combiner 22 (e.g., signal summing circuit) with the initially equalized signal 13 provided by the feedforward filter 12. The resulting equalized signal 13/23 is tested (e.g., sliced) by the decision circuit 16 to produce the output signal 17.

An additional signal combining circuit 18 combines the input 13/23 and output 17 signals of the decision circuit 16 to provide the error signal 19 representing the difference between the pre-decision 13/23 and post-decision 17 signals. As is well known, this error signal 19 is processed by the adaptive coefficients generator 14, along with the incoming data signal 11, to produce the adaptive coefficients 15 for the feedforward filter 12.

Additionally, so as to compensate for internal signal delays $t_s$, $t_e$ within the feedforward filter 12 and decision circuit 16, signal delay circuits 24s, 24e can be included in the signal paths for the incoming data signal 11 and pre-decision signal 13/23. Accordingly, the signal 25e to the signal combining circuit 18 is a delayed form of the pre-decision signal 13/23.

Figure 2:
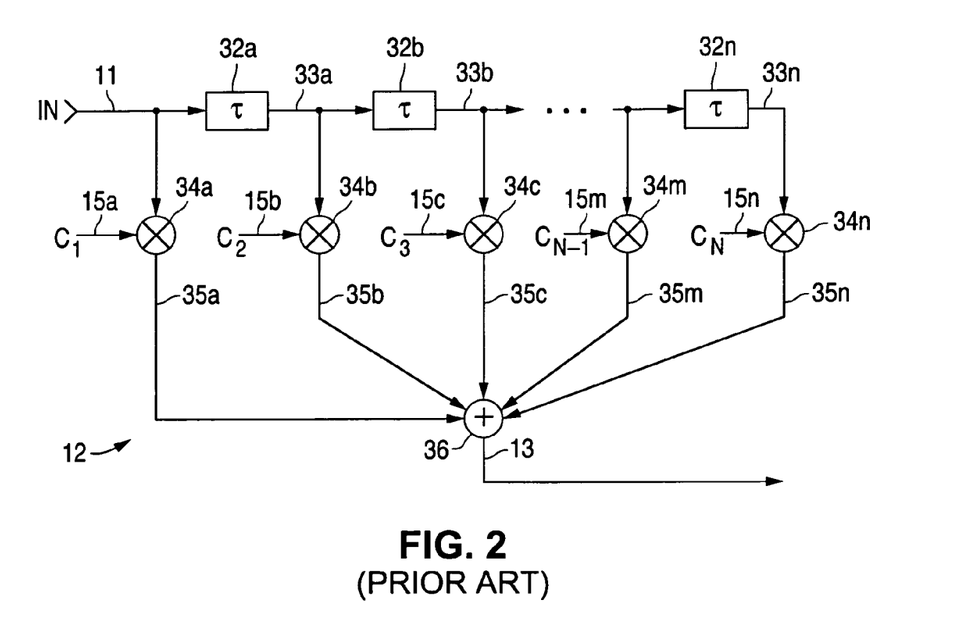
FIG. 2 is a block diagram of a conventional feedforward filter.

Referring to FIG. 2, a conventional feedforward filter 12 processes the incoming data signal 11 to produce the equalized signal 13 using a series of signal delay elements 32, multiplier circuits 34 and output summing circuit 36 in accordance with well-known techniques. Each of the successively delayed versions 33a, 33b, ..., 33n, as well as the incoming data signal 11, is multiplied in one of the multiplication circuits 34a, 34b, 34c, ..., 34n with its respective adaptive coefficient signal 15a, 15b, ..., 15n. The resulting product signals 35a, 35b, ..., 35n are summed in the signal summing circuit 36, with the resulting sum signal forming the equalized signal 13.

Figure 3:
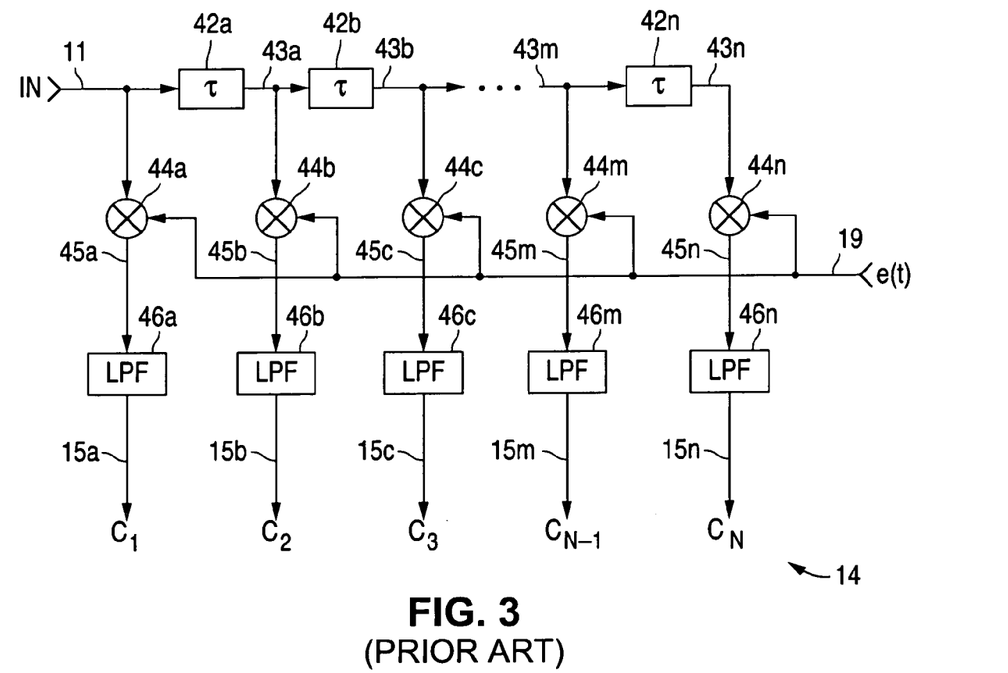
FIG. 3 is a block diagram of a conventional adaptive coefficients generator.

Referring to FIG. 3, a conventional adaptive coefficients generator 14 processes the incoming data signal 11 and feedback error signal 19 using a series of signal delay elements 42, signal multipliers 44 and signal integrators (e.g., low pass filters) 46 in accordance with well known techniques. The incoming signal 11 is successively delayed by the signal delay elements 42a, 42b, ..., 42n to produce successively delayed versions 43a, 43b, ..., 43n of the incoming signal 11. Each of these signals 11, 43a, 43b, ..., 43n is multiplied in its respective signal multiplier 44a, 44b, ..., 44n with the feedback error signal 19. The resulting product signals 45a, 45b, ..., 45n are individually integrated in the signal integration circuits 46a, 46b, ..., 46n to produce the individual adaptive coefficient signals 15a, 15b, ..., 15n.

Figure 4:
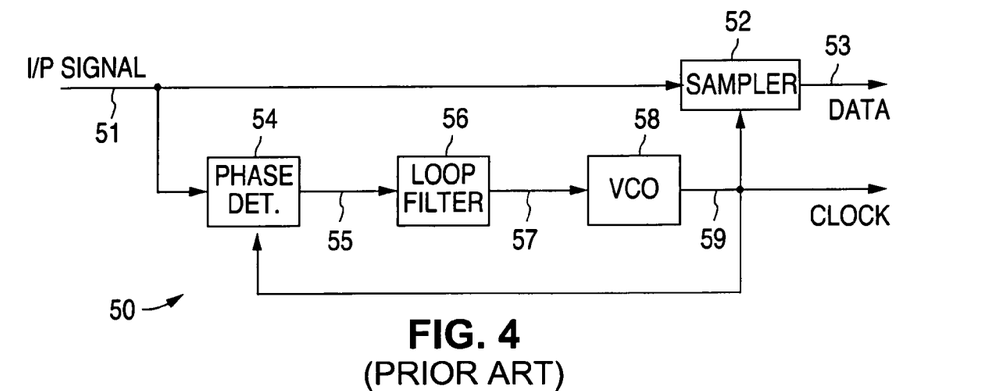
FIG. 4 is a block diagram of a conventional clock and data recovery circuit.

Referring to FIG. 4, one conventional technique for obtaining the appropriate sampling phase for a continuous-time signal that is being converted to a discrete signal involves the use of a clock and data recovery (CDR) circuit 50. The incoming signal 51 is sampled by a signal sampler 52 which is clocked by a clock signal 59 to recover the embedded data 53. The clock signal 59 is the output of an oscillator 58 (e.g., voltage-controlled oscillator) and is compared in signal phase with the incoming signal 51 in a phase detector 54. The phase detection signal 55 is filtered by the loop filter 56 (e.g., a low pass filter), with the filtered signal 57 controlling the oscillator 58.

While this circuitry 50 has proven to be useful in many applications, it is nonetheless insufficiently adaptive for compensating for the above-noted variable characteristics of analog circuitry and components.

SUMMARY OF THE INVENTION

In accordance with the presently claimed invention, an apparatus and method is provided for adaptively introducing a compensating signal latency related to a signal latency of a data symbol decision circuit. Adaptive timing control circuitry, including an interpolating mixer implemented as a tapped delay line with correlated tap coefficients, introduces a latency adaptively and substantially matching the latency of the data decision circuit for use within an adaptive equalizer, thereby minimizing the mean-squared error of such decision circuit. This adaptive latency is used in generating the feedback error signal which, in turn, can be used by the feedforward equalizer for dynamically adjusting its adaptive filter tap coefficients.

As will become evident from the following discussion, the presently claimed invention can be implemented and practiced in either the continuous time (e.g., analog) or discrete time (e.g., digital) domain. At the present point in time, data symbol rates less than one gigabit per second (1 Gb/s) can often be processed in either the continuous or discrete time domain, while data symbol rates greater than 1 Gb/s must generally be processed in the continuous time domain. However, as the applicable technology advances, it is expected that data symbol rates in excess of 1 Gb/s will also become more susceptible to processing in the discrete time domain as well. As will become further evident, the presently claimed invention benefits the host system or network by effectively increasing the signal-to-noise ratio (SNR), thereby reducing the bit error rate (BER) and, in turn, adding robustness (e.g., with respect to phase offsets or jitter among the data symbols). For example, in the case of a fiber optic network, such added performance and robustness will allow a longer network to be realized without a concomitant increase in network infrastructure.

In accordance with one embodiment of the presently claimed invention, adaptive circuitry for introducing a compensating signal latency related to a signal latency of a data symbol decision circuit includes signal terminals, interpolating mixer circuitry, phase detection circuitry and signal integration circuitry. A first signal terminal conveys a pre-decision data signal having a data symbol period associated therewith. A second signal terminal conveys an error signal corresponding to a difference between an adaptive signal and a post-decision data signal which corresponds to and follows the pre-decision data signal by a first signal latency. Interpolating mixer circuitry, coupled to the first signal terminal, receives and mixes an integrated signal and the pre-decision data signal to provide the adaptive signal, wherein the adaptive signal follows the pre-decision data signal by a second signal latency related to the first signal latency. Phase detection circuitry, coupled to the first and second signal terminals and having a selected signal delay, receives and detects a phase difference between the error signal and the pre-decision data signal to provide a detection signal. Signal integration circuitry, coupled to the phase detection circuitry and the interpolating mixer circuitry, receives and integrates the detection signal to provide the integrated signal, wherein the selected signal delay is selected such that the integrated signal has a substantially zero AC signal component.

In accordance with another embodiment of the presently claimed invention, adaptive circuitry for introducing a compensating signal latency related to a signal latency of a data symbol decision circuit includes signal receiving means, interpolating mixer means, phase detector means and signal integrator means. The signal receiving means is for receiving a pre-decision data signal having a data symbol period associated therewith, and an error signal corresponding to a difference between an adaptive signal and a post-decision data signal which corresponds to and follows the pre-decision data signal by a first signal latency. The interpolating mixer means is for receiving and mixing an integrated signal and the pre-decision data signal to generate the adaptive signal, wherein the adaptive signal follows the pre-decision data signal by a second signal latency related to the first signal latency. The phase detector means is for detecting a phase difference between the error signal and the pre-decision data signal to generate a detection signal. The signal integrator means is for integrating the detection signal to generate the integrated signal, wherein the selected signal delay is selected such that the integrated signal has a substantially zero AC signal component.

In accordance with another embodiment of the presently claimed invention, a method for adaptively introducing a compensating signal latency related to a signal latency of a data symbol decision circuit includes:

receiving a pre-decision data signal having a data symbol period associated therewith;

receiving an error signal corresponding to a difference between an adaptive signal and a post-decision data signal which corresponds to and follows the pre-decision data signal by a first signal latency;

receiving and mixing an integrated signal and the pre-decision data signal to generate the adaptive signal, wherein the adaptive signal follows the pre-decision data signal by a second signal latency related to the first signal latency;

detecting a phase difference between the error signal and the pre-decision data signal to generate a detection signal; and integrating the detection signal to generate the integrated signal, wherein the selected signal delay is selected such that the integrated signal has a substantially zero AC signal component.

DETAILED DESCRIPTION OF THE INVENTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed.

The subject matter discussed herein, including the presently claimed invention, is compatible and suitable for use with the subject matter disclosed in the following copending, commonly assigned patent applications (the disclosures of which are incorporated herein by reference): U.S. patent application Ser. No. 10/117,293, filed Apr. 5, 2002, and entitled "Compensation Circuit For Reducing Intersymbol Interference Products Caused By Signal Transmission Via Dispersive Media"; U.S. patent application Ser. No. 10/179,689, filed Jun. 24, 2002, and entitled "Crosstalk Compensation Engine For Reducing Signal Crosstalk Effects Within A Data Signal"; U.S. patent application Ser. No. 10/244,500, filed Sep. 16, 2002, and entitled "Compensation Method For Reducing Intersymbol Interference Products Caused By Signal Transmission Via Dispersive Media"; U.S. patent application Ser. No. 10/290,674, filed Nov. 8, 2002, and entitled "Compensation Circuit And Method For Reducing Intersymbol Interference Products Caused By Signal Transmission Via Dispersive Media"; and U.S. patent application Ser. No. 10/290,571, filed Nov. 8, 2002, and entitled "Adaptive Coefficient Signal Generator For Adaptive Signal Equalizers With Fractionally-Spaced Feedback"; U.S. patent application Ser. No. 10/290,993, filed Nov. 8, 2002, and entitled "Adaptive Signal Equalizer With Adaptive Error Timing And Precursor/Postcursor Configuration Control"; U.S. patent application Ser. No. 10/322,024, filed Dec. 17, 2002, and entitled "Adaptive Coefficient Signal Generator For Adaptive Signal Equalizers With Fractionally-Spaced Feedback"; U.S. patent application Ser. No. 10/321,876, filed Dec. 17, 2002, and entitled "Adaptive Signal Equalizer With Adaptive Error Timing And Precursor/Postcursor Configuration Control"; and U.S. patent application Ser. No. 10/179,996, filed Jun. 24, 2002, and entitled "Programmable Decoding of Codes of Varying Error-Correction Capability".

The following discussion focuses primarily upon continuous-time adaptive signal processing architectures. However, it should be understood that the presently claimed invention is applicable to both discrete-time and continuous-time signal processing architectures. (One example of a discrete-time signal processing architecture where the presently claimed invention can be applied includes synchronization-related functions, such as code tracking in spread-spectrum signals.) Uses for the adaptive timing control block are discussed. For example, the adaptive timing control block can be used to match the latency of the continuous-time slicer within an adaptive equalizer with LMS-based adaptation such that the mean-squared error at the slicer is minimized when the latency induced by the timing control block is approximately the same as that of the continuous-time slicer. From the following discussion it will be seen that the presently claimed invention provides for efficient and adaptive estimation and application of a near-optimal latency (from a BER performance standpoint) to a continuous-time signal using LMSE adaptation (which, as noted, is also applicable to discrete-time signals). Such adaptive timing control will be referenced as Adaptive LMS-based Timing Interpolation (ALTI).

As one example, an ALTI block within an adaptive (LMS-based) continuous-time linear equalizer can be used to induce a latency to the input signal of the slicer so as to match the latency of the slicer. In such an application, the mean-squared error at the slicer is minimized when the latency induced by the ALTI block is approximately the same as the latency of the slicer.

Figure 5:
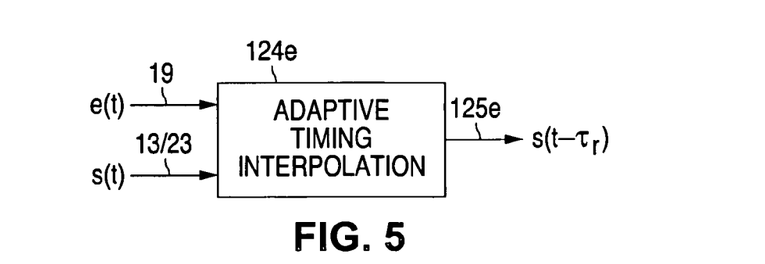
FIG. 5 illustrates the signal interfaces for an adaptive signal latency control circuit in accordance with the presently claimed invention.

Referring to FIG. 5, such an adaptive timing control block can be implemented as an adaptive timing interpolation circuit 124e which processes the feedback error signal 19 in conjunction with the input signal 13/23 to produce the pre-decision signal 125e for the combining circuit 18 (FIG. 1) producing the feedback error signal 19. This pre-decision signal 125e corresponds to and follows the input signal 13/23 by a signal latency related (e.g., substantially equal) to the signal latency introduced by the decision circuit 16.

Figure 6:
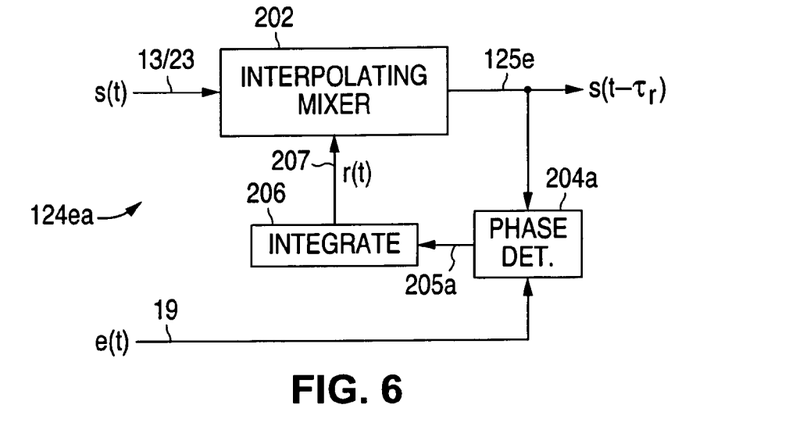
FIG. 6 is a block diagram of an adaptive signal latency control circuit in accordance with one embodiment of the presently claimed invention.

Referring to FIG. 6, one embodiment 124ea of the adaptive timing interpolation circuit 124e includes an interpolating mixer 202, a phase detector 204a and a signal integrator 206, interconnected substantially as shown. The error signal 19 is compared in signal phase by the phase detector 204a with the delayed pre-decision signal 125e. The resulting detection signal 205a is integrated by the signal integrator 206 (e.g., a low pass filter) to produce an interpolation control signal 207 for the interpolating mixer 202.

Figure 7:
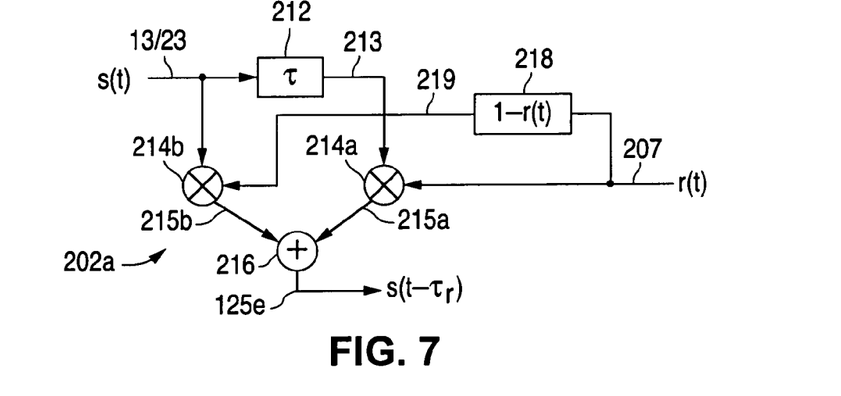
FIG. 7 is a block diagram of one embodiment of an interpolating mixer in accordance with the presently claimed invention.

Referring to FIG. 7, one embodiment 202a of the interpolating mixer 202 can be implemented as a tapped delay line with correlated tap coefficients. The input signal 13/23 is delayed by a signal delay element 212 which is a fractional delay element introducing a delay which is less than one data symbol period in duration. The resulting fractionally delayed signal 213 and the original input signal 13/23 are mixed (e.g., multiplied) in respective signal mixers 214a, 214b with respective interpolation control signals 207, 219 representing timing interpolation parameters (discussed in more detail below). The first timing interpolation parameter signal 207 is the feedback signal from the signal integrator 206 (FIG. 6). This signal 207 is also complemented by a signal complement circuit 218 in which the input signal 207 is subtracted from a normalized value (e.g., unity) to produce the second timing interpolation parameter signal 219. The resultant mixed signals 215a, 215b are combined (e.g., summed) in a signal combining circuit 216 to produce the delayed pre-decision signal 125e.

Figure 8:
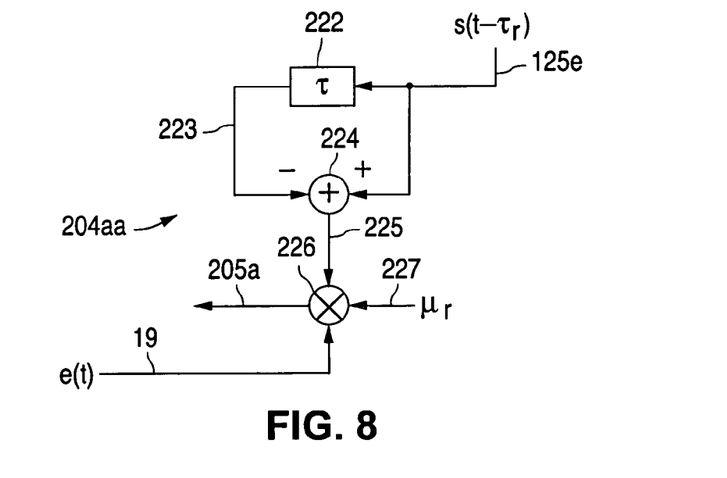
FIG. 8 is a block diagram of one embodiment of a phase detector in accordance with the presently claimed invention.

Referring to FIG. 8, one embodiment 204aa of the phase detector 204a (FIG. 6) can be implemented using a fractional delay element 222, signal combining circuit 224 and signal mixer 226, interconnected substantially as shown. The delayed pre-decision signal 125e is further delayed by the fractional delay element 222, and the delayed pre-decision signal 125e and further delayed signal 223 are combined in the signal combiner 224 such that the further delayed signal 223 is subtracted from the input signal 125e. The resulting combined signal 225 is mixed (e.g., multiplied) in the signal mixer 226 with the error signal 19 (and a gain constant 227, as desired) to produce the phase detection signal 205a.

Figure 9:
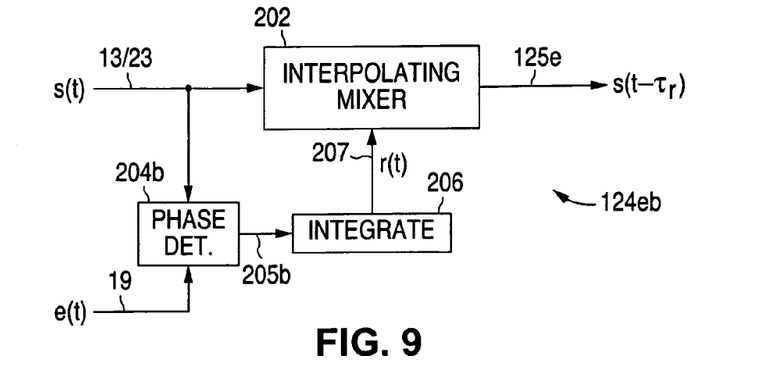
FIG. 9 is a block diagram of an adaptive signal latency control circuit in accordance with another embodiment of the presently claimed invention.

Referring to FIG. 9, an alternative embodiment 124eb of the adaptive timing interpolation circuit 124e (FIGS. 5 and 6) includes the interpolating mixer 202, another phase detector 204b and the signal integrator 206, interconnected substantially as shown. In this embodiment 124eb, the input signal 13/23 is compared in phase with the error signal 19 in the phase detector 204b. The phase detection signal 205b is integrated by the signal integrator 206 to produce the control signal 207 for the interpolating mixer 202.

Figure 10A:
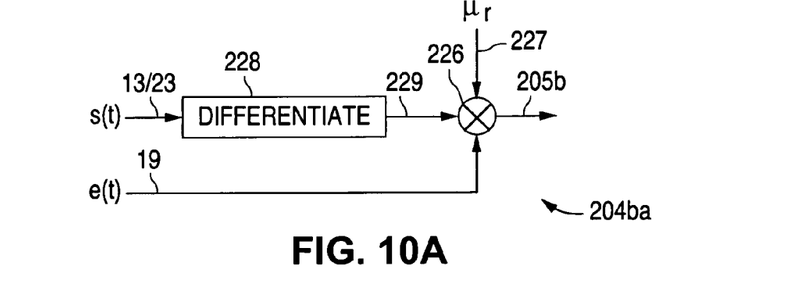
FIG. 10A is a block diagram of another embodiment of a phase detector in accordance with the presently claimed invention.

Referring to FIG. 10A, one embodiment 204ba of this phase detector 204b includes a signal differentiation circuit 228 and the signal mixer 226, interconnected substantially as shown. The input signal 13/23 is differentiated by the signal differentiation circuit 228 (e.g., a high pass filter). The resulting differentiated signal 229 is mixed (e.g., multiplied) in the signal mixer 226 with the error signal 19 (and a gain constant 227, as desired) to produce the phase detection signal 205b.

Figure 10B:
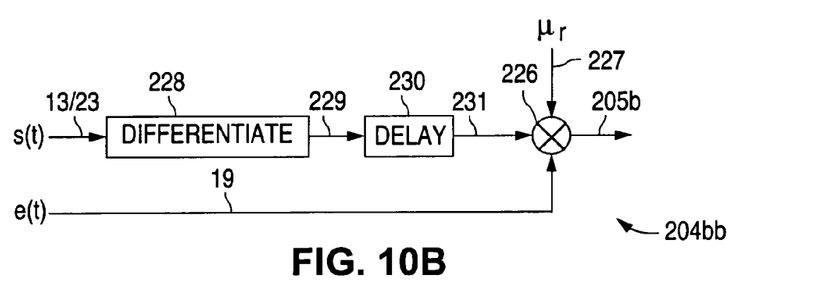
FIG. 10B is a block diagram of another embodiment of a phase detector in accordance with the presently claimed invention.

Referring to FIG. 10B, an alternative embodiment 204bb of this phase detector 204b includes the signal differentiation circuit 228 and the signal mixer 226 plus a delay circuit 230, interconnected substantially as shown, to produce a differentiated and delayed signal 231 for mixing in the signal mixer 226 with the error signal 19. In this embodiment 204bb, the differentiated signal 229 is delayed by a signal delay Tdelay selected to be the sum of the signal delay T202 through the interpolating mixer 202 and the signal delay T18 through the signal combining circuit 18 (FIG. 1) with the signal delay T228 through the signal differentiation circuit 228 subtracted out, i.e., Tdelay=T202+T18−T228. As a result of this delay introduced by the delay circuit 230, the control signal 207 produced by the integrator 206 will have a substantially zero AC signal component. (It will be understood that the order of the signal differentiation circuit 228 and delay circuit 230 can also be reversed, such that the input signal 13/23 is first delayed by the delay circuit 130 and then differentiated by the signal differentiation circuit 228 to produce the differentiated and delayed signal 231.)

A number of enhancements or modifications may be used to improve the performance over the ALTI with two taps.

Multi-tap ALTI with Linear Interpolation

Multiple taps (more than two) or a variable number of taps may be used for the interpolating mixer within the ALTI. A simple but effective approach here is to do multiple stages of linear interpolation, with each stage providing linear interpolation between some two points obtained from the earlier stage to give one new point which may be used in the next stage. The multi-tap ALTI will then have more than one parameter to adapt.

As an example, consider three taps within the ALTI with input signals s(t),s(t−τ),s(t−2·τ). Then, $s(t-\tau_{r_1})=r_1 \cdot s(t)+(1-r_1) \cdot s(t-\tau)$ may first be formed as a linear interpolation of s(t),s(t−τ) and then $s(t-\tau_{r_2})=r_2 \cdot s(t-\tau_{r_1})+(1-r_2) \cdot s(t-2\cdot\tau)$ is expected to be the final interpolated signal. The tap coefficients for the ALTI with input signals s(t),s(t−τ),s(t−2·τ) are then $r_1 \cdot r_2, (1-r_1) \cdot r_2, (1-r_2)$. The adaptation updates of the two parameters $r_1, r_2$ in the continuous-time domain are as follows:

$$r_1(t) = \mu_r \cdot \int_0^t r_2(v) \cdot e(v) \cdot [s(v) - s(v-\tau)] dv$$

$$r_2(t) = \mu_r \cdot \int_0^t e(v) \cdot [r_1 \cdot s(v) + (1-r_1) \cdot s(v-\tau) - s(v-2\cdot\tau)] dv.$$

Let us define an intermediate output of the ALTI as $f_i(t)=r_1 \cdot r_2 s(t)+(1-r_1) \cdot r_2 s(t-\tau)$, and the final output as $f(t)=f_i(t)+(1-r_2) \cdot s(t-2\cdot\tau)$.

Then we have the following simplified update equations, $$r_1(t) = \mu_r \cdot \int_0^t e(v) \cdot \frac{df_i(v)}{dv} dv$$

$$r_2(t) = \mu_r \cdot \int_0^t e(v) \cdot \frac{df(v)}{dv} dv.$$

Note that the signals $$\frac{df_i(v)}{dv}, \frac{df(v)}{dv}$$

may easily be implemented by passing the outputs of the ALTI $f_i(t), f(t)$ through a high-pass filter such as a capacitor-resistor differentiator block.

Quasi-LMSE-based Adaptation Schemes for Interpolating Mixer

Other adaptation techniques for controlling the timing control ratio parameter in the interpolating mixer within the ALTI may also be used. One such technique may include the use of tap coefficients on the feedforward/feedback equalizers which adapt based on LMSE in a manner that this approximates LMSE-based adaptation for the timing control ratio parameter. Thus, for a single-tap feedback equalizer with feedback tap coefficient $f$ and feedforward coefficients $\{c_i\}_{i=0}^{N}$, the following coefficient-based ALTI adaptation technique for adapting to the slicer timing may be used (with appropriately selected weights $\{w_i\}$ and appropriate value of x):

$$r_{DVI} = \frac{\mu_{DVI}}{\mu_c} \cdot \int_t \left( \sum_{i=-3}^{4} w_i \cdot \left[ \sum_{k=0}^{7} c_k \cdot c_{i+k} - f \cdot \sum_{k=0}^{7} c_k \cdot c_{i+k+x} + \ldots + (-1)^n f^n \cdot \sum_{k=0}^{7} c_k \cdot c_{i+k+n \cdot x} \right] \right) \cdot dt$$

A simpler (more linear) alternative manner of adapting the timing control ratio is as provided below:

$$r = \mu \cdot \int_0^t \left( \sum_{i=0}^{L} w_i \cdot c_i \right) dt$$

Figure 11:
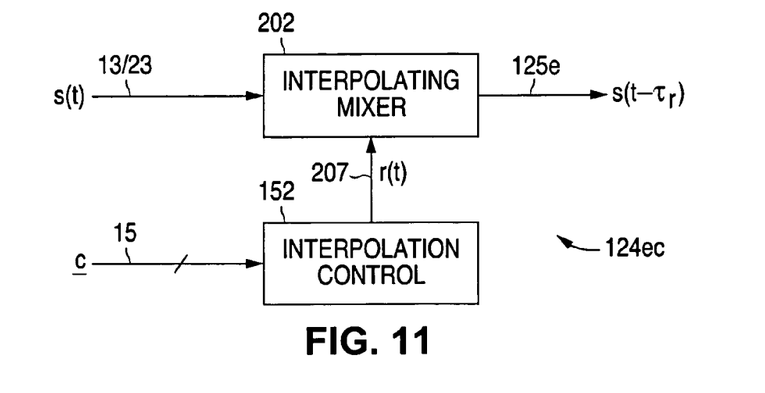
FIG. 11 is a block diagram of an adaptive signal latency control circuit in accordance with another embodiment of the presently claimed invention.

Referring to FIG. 11, another embodiment 124ec of the adaptive timing interpolation circuit 124e (FIG. 5) includes the interpolating mixer 202 and an interpolation controller 152, interconnected substantially as shown. Together, the interpolating mixer 202 and interpolation controller 152 process the adaptive coefficient signals 15 (instead of the feedback error signal 19 as done in the embodiments 124ea, 124eb of FIGS. 6 and 9) for the feedforward filter 12 (FIG. 1) in conjunction with the input signal 13/23 to produce the pre-decision signal 125e. As discussed in more detail below, the interpolation controller 152 processes the adaptive coefficient signals 15 to produce the interpolation control signal 207 for the interpolating mixer 202.

Figure 12:
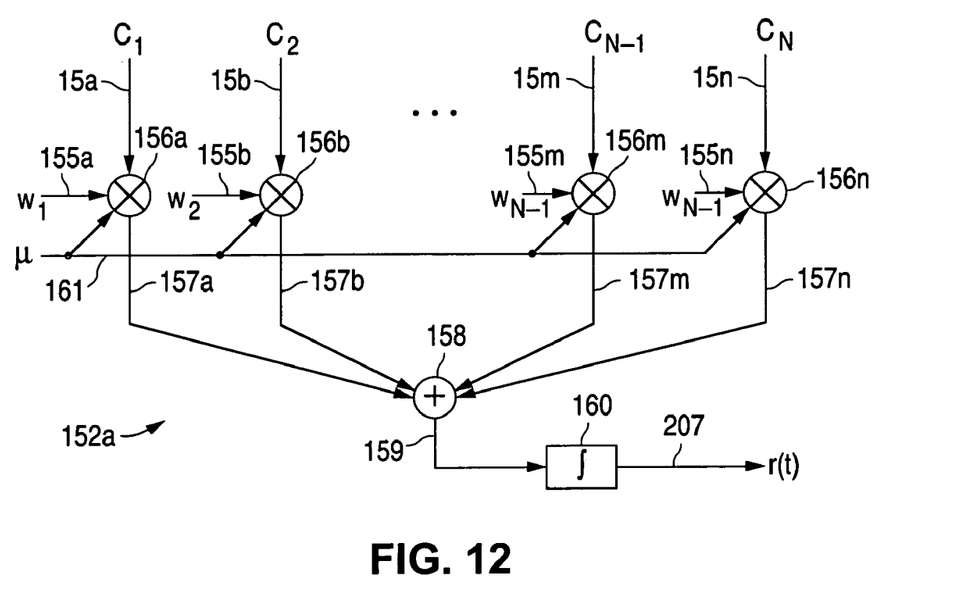
FIG. 12 is a block diagram of one embodiment of an interpolation controller in accordance with the presently claimed invention.

Referring to FIG. 12, one embodiment 152a of the interpolation controller 152 in accordance with the presently claimed invention includes a set of signal weighting circuits (e.g., multipliers) 156, a signal combining (e.g., summing) circuit 158 and a signal integration circuit (e.g., low pass filter) 160, interconnected substantially as shown. Each of the feedback adaptive coefficient signals 15a, 15b, . . . , 15n is multiplied in a respective multiplier 156a, 156b . . . , 156n with a corresponding weighted, or scaled, signal 155a, 155b, . . . , 155n (as well as a scaling factor $\mu$ 161, as desired). The resulting product signals 157a, 157b, . . . 157n are combined (e.g., summed) in the signal combiner 158. The combined signal 159 is integrated by the signal integrator (e.g., low pass filter) 160 to produce the interpolation control signal 207r(t).

Alternatively, it should be understood that this technique can also be implemented using adaptive coefficient signals from an adaptive feedback filter 20 (FIG. 1).

Another technique for adapting the timing control ratio parameter may be to use an "eye monitor" test.

Multi-tap ALTI with Superlinear Interpolation

While linear interpolation has been generally considered, more general interpolation may also be employed, especially when more than two taps are included within the fat tap (see U.S. patent application Ser. No. 10/290,571) such as quadratic interpolation. As an example, with three taps within the ALTI with input signals s(t),s(t−τ),s(t−2τ), the corresponding tap coefficients may be given as $f_0(r), f_1(r), f_2(r)$ for some appropriately selected functions $f_0(\cdot), f_1(\cdot), f_2(\cdot)$, which in general may also be functions of more than one parameter. The adaptation updates are then given as:

$$\frac{d}{dt} r(t) = \mu_r \cdot e(t) \cdot [f_0'(r) \cdot s(t) + f_1'(r) \cdot s(t-\tau) + f_2'(r) \cdot s(t - 2 \cdot \tau)].$$

ALTI with Gain Offset

To compensate, for a residual but unknown gain offset between the taps in the interpolating mixer within the ALTI or to control the linearity range, the ALTI with gain offset may be used. As an example consider two taps within the ALTI with input signals s(t),s(t−τ). The tap coefficients for these two taps are then respectively r,a·(1−r). The adaptation updates for the two parameters (a,r) are then given as:

$$r(t) = \mu_r \cdot \int_0^t e(v) \cdot [s(v) - a \cdot s(v - \tau)] dv$$

$$a(t) = \mu_c \cdot \int_0^t e(v) \cdot (1 - r) \cdot s(v - \tau) dv.$$

Figure 13:
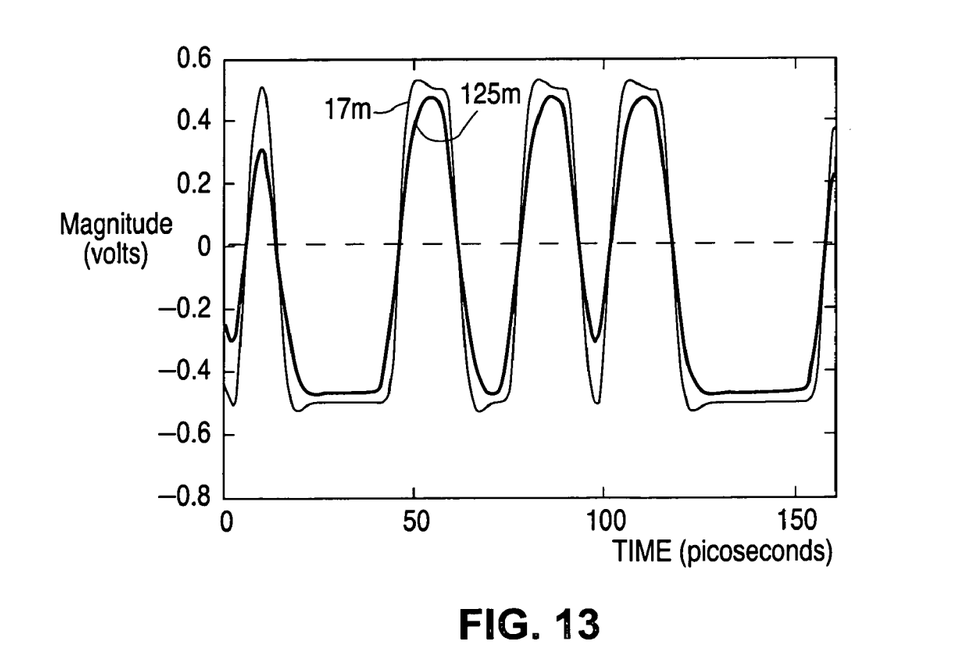
FIG. 13 is a signal timing diagram illustrating expected performance of an adaptive signal equalizer using an adaptive signal latency control circuit in accordance with the presently claimed invention.

Referring to FIG. 13, the performance that can be expected of an adaptive (LMS-based) continuous-time linear signal equalizer using an adaptive signal latency control circuit in accordance with the presently claimed invention is as illustrated. With ALTI circuitry 124e (FIG. 5) used to introduce a latency to the input signal 13/23 of the data symbol signal slicer 16 so as to effectively match the latency of the slicer 16 itself, the difference in latency at the zero signal crossing between the ALTI output 125 m and the slicer output 17 m is virtually nil as compared to the data symbol period. For this example, with a 10 gigabit/second data signal (100 picosecond symbol period), the latency difference is less than four picoseconds.

Based upon the foregoing discussion, it should be recognized that each of the exemplary embodiments of the presently claimed invention as depicted and discussed herein offer similar advantages without any one of such embodiments necessarily being preferred over the others. As will be readily appreciated by one of ordinary skill in the art, the particular topology of each embodiment may cause one particular embodiment to be deemed more advantageous for the specific host system or network in which such embodiment is to be implemented (e.g., due to circuit design rules or layout constraints).

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including adaptive circuitry for introducing a compensating signal latency related to a signal latency of a data symbol decision circuit, comprising:

a first signal terminal that conveys a pre-decision data signal having a data symbol period associated therewith;

a second signal terminal that conveys an error signal corresponding to a difference between an adaptive signal and a post-decision data signal which corresponds to and follows said pre-decision data signal by a first signal latency;

interpolating mixer circuitry, coupled to said first signal terminal, that receives and mixes an integrated signal and said pre-decision data signal to provide said adaptive signal, wherein said adaptive signal follows said pre-decision data signal by a second signal latency related to said first signal latency;

phase detection circuitry, coupled to said first and second signal terminals and having a selected signal delay, that receives and detects a phase difference between said error signal and said pre-decision data signal to provide a detection signal; and signal integration circuitry, coupled to said phase detection circuitry and said interpolating mixer circuitry, that receives and integrates said detection signal to provide said integrated signal, wherein said selected signal delay is selected such that said integrated signal has a substantially zero AC signal component.

2. The apparatus of claim 1, wherein said interpolating mixer circuitry comprises:

fractional delay circuitry, coupled to said first signal terminal, that receives and delays said pre-decision data signal to provide a delayed signal corresponding to and following said pre-decision data signal by a fraction of said data symbol period;

signal weighting circuitry, coupled to said first signal terminal and said fractional delay circuitry, that receives said integrated signal and in response thereto receives and weights said pre-decision data signal and said delayed signal to provide first and second weighted signals; and signal combining circuitry, coupled to said signal weighting circuitry, that receives and combines said first and second weighted signals to provide said adaptive signal.

3. The apparatus of claim 2, wherein said pre-decision data signal and said delayed signal are correlated.

4. The apparatus of claim 2, wherein said signal weighting circuitry comprises:

signal complement circuitry, coupled to said signal integration circuitry, that receives and complements said integrated signal to provide a complement signal;

a first weighting circuit, coupled to said signal integration circuitry and said fractional delay circuitry, that receives said integrated signal and in response thereto receives and weights said delayed signal to provide said first weighted signal; and a second weighting circuit, coupled to said signal complement circuitry and said first signal terminal, that receives said complement signal and in response thereto receives and weights said pre-decision data signal to provide said second weighted signal.

5. The apparatus of claim 4, wherein:

said integrated signal corresponds to a correlation factor; and said complement signal corresponds to a difference between a normalized factor and said correlation factor.

6. The apparatus of claim 2, wherein said signal weighting circuitry comprises:

signal complement circuitry, coupled to said signal integration circuitry, that receives and complements said integrated signal to provide a complement signal; and signal multiplication circuitry, further coupled to said signal complement circuitry, that multiplies said integrated signal and said delayed signal to provide said first weighted signal, and multiplies said complement signal and said pre-decision data signal to provide said second weighted signal.

7. The apparatus of claim 6, wherein:

said integrated signal corresponds to a correlation factor; and said complement signal corresponds to a difference between a normalized factor and said correlation factor.

8. The apparatus of claim 2, wherein said signal combining circuitry comprises signal summing circuitry that sums said first and second weighted signals to provide said adaptive signal.

9. The apparatus of claim 1, wherein said phase detection circuitry comprises:

signal differentiation circuitry, coupled to said first signal terminal and having said selected signal delay, that differentiates and delays said pre-decision signal to provide a resultant signal, wherein respective portions of said resultant signal are delayed relative to corresponding portions of said pre-decision data signal by said selected signal delay; and signal combining circuitry, coupled to said signal differentiation circuitry and said second signal terminal, that receives and combines said resultant signal and said error signal to provide said detection signal.

10. The apparatus of claim 9, wherein said signal differentiation circuitry comprises high pass filter circuitry that high pass filters and delays said pre-decision signal to produce said resultant signal.

11. The apparatus of claim 9, wherein said signal differentiation circuitry comprises:

a high pass filter circuit that high pass filters said pre-decision signal to produce a high pass filtered signal; and signal delay circuitry, coupled to said high pass filter circuit, that delays said high pass filtered signal to produce said resultant signal.

12. The apparatus of claim 9, wherein said signal combining circuitry comprises signal multiplication circuitry that multiplies said resultant signal and said error signal to provide said detection signal.

13. The apparatus of claim 1, wherein said signal integration circuitry comprises low pass filter circuitry.

14. The apparatus of claim 1, further comprising signal combining circuitry, coupled to said interpolating mixer circuitry and said second signal terminal, that receives and combines said post-decision data signal and said adaptive signal to provide said error signal.

15. An apparatus including adaptive circuitry for introducing a compensating signal latency related to a signal latency of a data symbol decision circuit, comprising:

signal receiving means for receiving
a pre-decision data signal having a data symbol period associated therewith, and
an error signal corresponding to a difference between an adaptive signal and a post-decision data signal which corresponds to and follows said pre-decision data signal by a first signal latency;

interpolating mixer means for receiving and mixing an integrated signal and said pre-decision data signal to generate said adaptive signal, wherein said adaptive signal follows said pre-decision data signal by a second signal latency related to said first signal latency;

phase detector means for introducing a selected signal delay and for detecting a phase difference between said error signal and said pre-decision data signal to generate a detection signal; and signal integrator means for integrating said detection signal to generate said integrated signal, wherein said selected signal delay is selected such that said integrated signal has a substantially zero AC signal component.

16. The apparatus of claim 15, wherein said interpolating mixer means comprises:

fractional delay means for delaying said pre-decision data signal to generate a delayed signal corresponding to and following said pre-decision data signal by a fraction of said data symbol period;

signal weighting means for weighting said pre-decision data signal and said delayed signal in response to said integrated signal to generate first and second weighted signals; and signal combiner means for combining said first and second weighted signals to generate said adaptive signal.

17. The apparatus of claim 16, wherein said pre-decision data signal and said delayed signal are correlated.

18. The apparatus of claim 16, wherein said signal weighting means comprises:

signal complementing means for complementing said integrated signal to generate a complement signal;

first weighting means for weighting said delayed signal in response to said integrated signal to generate said first weighted signal; and second weighting means for weighting said pre-decision data signal in response to said complement signal to generate said second weighted signal.

19. The apparatus of claim 18, wherein:

said integrated signal corresponds to a correlation factor; and said complement signal corresponds to a difference between a normalized factor and said correlation factor.

20. The apparatus of claim 16, wherein said signal weighting means comprises:

signal complementing means for complementing said integrated signal to generate a complement signal; and signal multiplier means for
multiplying said integrated signal and said delayed signal to generate said first weighted signal, and
multiplying said complement signal and said pre-decision data signal to generate said second weighted signal.

21. The apparatus of claim 20, wherein:

said integrated signal corresponds to a correlation factor; and said complement signal corresponds to a difference between a normalized factor and said correlation factor.

22. The apparatus of claim 15, wherein said phase detector means comprises:

signal differentiator means for differentiating and delaying said pre-decision data signal to generate a resultant signal, wherein respective portions of said resultant signal are delayed relative to corresponding portions of said pre-decision data signal by said selected signal delay; and signal combiner means for combining said resultant signal and said error signal to generate said detection signal.

23. The apparatus of claim 15, further comprising signal combiner means for receiving and combining said post-decision data signal and said adaptive signal to generate said error signal.

24. A method for adaptively introducing a compensating signal latency related to a signal latency of a data symbol decision circuit, comprising:

receiving a pre-decision data signal having a data symbol period associated therewith;

receiving an error signal corresponding to a difference between an adaptive signal and a post-decision data signal which corresponds to and follows said pre-decision data signal by a first signal latency;

receiving and mixing an integrated signal and said pre-decision data signal to generate said adaptive signal, wherein said adaptive signal follows said pre-decision data signal by a second signal latency related to said first signal latency;

detecting a phase difference between said error signal and said pre-decision data signal to generate a detection signal, wherein said pre-decision data signal is delayed by a selected signal delay; and integrating said detection signal to generate said integrated signal, wherein said selected signal delay is selected such that said integrated signal has a substantially zero AC signal component.

25. The method of claim 24, wherein said receiving and mixing an integrated signal and said pre-decision data signal to generate said adaptive signal comprises:

delaying said pre-decision data signal to generate a delayed signal corresponding to and following said pre-decision data signal by a fraction of said data symbol period;

weighting said pre-decision data signal and said delayed signal in response to said integrated signal to generate first and second weighted signals; and combining said first and second weighted signals to generate said adaptive signal.

26. The method of claim 25, wherein said weighting said pre-decision data signal and said delayed signal in response to said integrated signal to generate first and second weighted signals comprises:

complementing said integrated signal to generate a complement signal;

weighting said delayed signal in response to said integrated signal to generate said first weighted signal; and weighting said pre-decision data signal in response to said complement signal to generate said second weighted signal.

27. The method of claim 26, wherein:

said receiving and integrating said detection signal to generate said integrated signal comprises generating said integrated signal corresponding to a correlation factor; and said complementing said integrated signal to generate a complement signal comprises generating said complement signal corresponding to a difference between a normalized factor and said correlation factor.

28. The method of claim 25, wherein said weighting said pre-decision data signal and said delayed signal in response to said integrated signal to generate first and second weighted signals comprises:

complementing said integrated signal to generate a complement signal;

multiplying said integrated signal and said delayed signal to generate said first weighted signal; and multiplying said complement signal and said pre-decision data signal to generate said second weighted signal.

29. The method of claim 28, wherein:
said receiving and integrating said detection signal to generate said integrated signal comprises generating said integrated signal corresponding to a correlation factor; and
said complementing said integrated signal to generate a complement signal comprises generating said complement signal corresponding to a difference between a normalized factor and said correlation factor.

30. The method of claim 24, wherein said detecting a phase difference between said error signal and said pre-decision data signal to generate a detection signal comprises:

differentiating and delaying said pre-decision signal to generate a resultant signal, wherein respective portions of said resultant signal are delayed relative to corresponding portions of said pre-decision data signal by said selected signal delay; and
combining said resultant signal and said error signal to generate said detection signal.

31. The method of claim 24, further comprising combining said post-decision data signal and said adaptive signal to generate said error signal.

* * * * *